United States Patent [19]

Stas et al.

[11] Patent Number: 4,804,397
[45] Date of Patent: Feb. 14, 1989

[54] PARTIAL PRESS IN GRAVITY BENDING FURNACE AND METHOD OF USE

[75] Inventors: Joseph D. Stas, Gibsonia; Robert G. Frank, Murrysville; James H. Schwartz, Gibsonia, all of Pa.

[73] Assignee: PPG Industries, Inc., Pittsburgh, Pa.

[21] Appl. No.: 133,963

[22] Filed: Dec. 16, 1987

[51] Int. Cl.[4] .......................................... C03B 23/025
[52] U.S. Cl. ........................................ 65/107; 65/106; 65/273; 65/287; 65/290; 65/291
[58] Field of Search ................ 65/106, 107, 273, 287, 65/290, 291

[56] References Cited

U.S. PATENT DOCUMENTS

| | | | |
|---|---|---|---|
| 3,116,993 | 1/1964 | Richardson | 65/290 X |
| 3,220,819 | 11/1965 | Jendrisak | 65/290 |
| 4,074,996 | 2/1978 | Hagedorn et al. | 65/290 X |
| 4,262,267 | 12/1986 | Reese et al. | 65/106 |
| 4,265,650 | 5/1981 | Reese et al. | 65/104 |
| 4,496,386 | 1/1985 | Hymore et al. | 65/106 |
| 4,501,603 | 2/1985 | Frank et al. | 65/106 |

FOREIGN PATENT DOCUMENTS

0250311 A1 12/1987 European Pat. Off. .
1100238 2/1961 Fed. Rep. of Germany ........ 65/291

Primary Examiner—Arthur Kellogg
Attorney, Agent, or Firm—Andrew C. Siminerio

[57] ABSTRACT

A partial press for shaping heat softened glass sheets as they are supported on a bending mold and conveyed through a lehr includes a press member that contacts selected portions of the glass sheet. The press member moves with the glass sheet so that there is no relative horizontal movement between the press member and the glass sheet as the glass sheet is conveyed through the lehr.

20 Claims, 5 Drawing Sheets

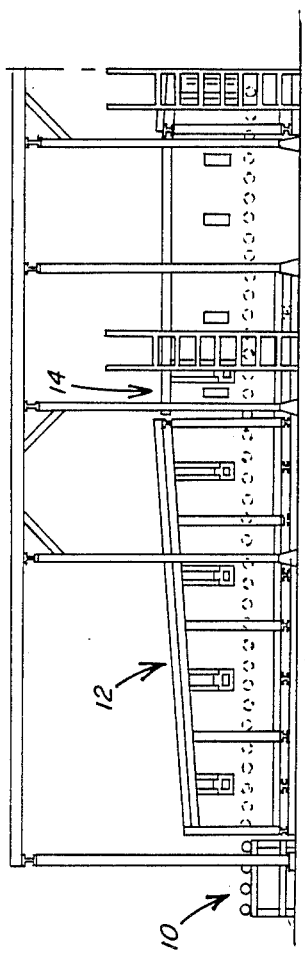
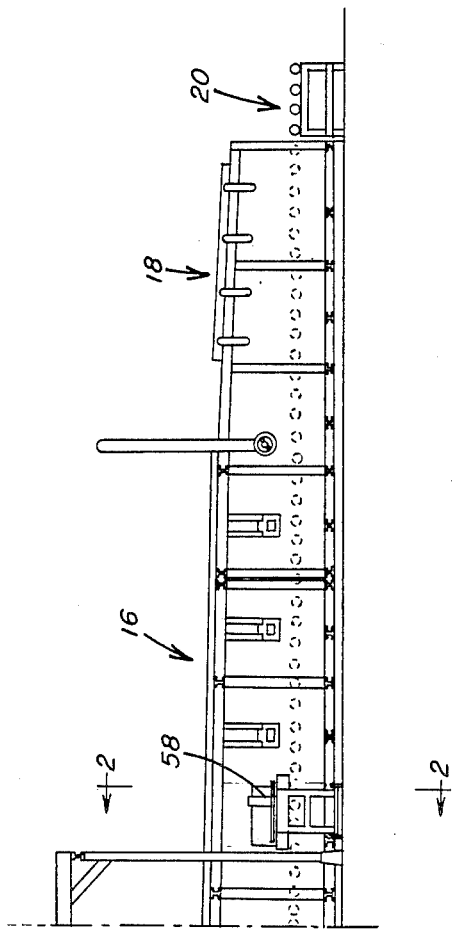
FIG. 1a
FIG. 1b

PARTIAL PRESS IN GRAVITY BENDING FURNACE AND METHOD OF USE

BACKGROUND OF THE INVENTION

1. Field of the Invention

This invention relates to sag bending of glass sheets on bending irons and in particular to a method and apparatus for press bending selected portions of the glass sheets on bending irons while moving through a heating lehr.

2. A Technical Considerations

In the practice of sag bending to form shaped glass windows for automobiles and like, as disclosed in U.S. Pat. No. 4,375,978 to Reese, glass sheets are positioned on and supported by a skeletal bending mold. The shaping rail of the mold has a shape and configuration similar to that of the shaped glass sheet at a location slightly inboard of its peripheral edge. The bending molds are then conveyed in succession through a heating lehr where the glass sheet is heated to its deformation temperature such that it begins to sag by gravity until the glass sheet conforms to the configuration of the shaping rail. After the glass sheet is shaped, the mold is conveyed through an annealing zone where the glass sheet is cooled in a controlled manner from its deformation temperature through its annealing range to anneal the glass sheet.

The glass sagging technique has been the method used to bend two glass sheets, or doublets, simultaneously, which sheets are subsequently laminated together to form a laminated automobile windshield. The windshield is curved to conform and blend into the shape of an automobile vehicle in which it is installed.

A critical shape parameter of curved glass sheets used for windshields is the approach angle of the glass sheets along the A-post of the vehicle body. The approach angle is the angle at which the windshield meets the vehicle body at the generally vertically extending A-posts of the window frame. It has been found that in sag bending glass sheets with a deep sag or reverse curvature, there is a tendency for the sheets to draw glass from their longitudinal end sections. As a result, the glass sheets may tend to lift off the end rail sections of the outline bending mold and have reduced curvature causing the sheets to deviate from desired shape and tolerances. This deviation may also be caused by overheating the outer areas of the glass sheet to achieve proper curvature along the outer edge of the longitudinal section of the glass sheet to achieve the desired curve configuration.

As automotive stylists strive for more aerodynamic designs, the windshields are assuming more complex and deeper bend configurations. In addition, the windshield edges are approaching the A post of the vehicle body at a more flush fashion to provide a smoother transition between the windshield surface and the vehicle body surface. As the windshields designs become more complicated with compound and reverse curvatures, these shapes are becoming increasingly difficult to control during conventional sag bending operations.

It would be advantageous to develop a method of forming glass sheets incorporating conventional sag bending techniques with other shaping techniques so as to form and maintain the desired configurations required for proper vehicle assembly.

2B. Patents of Interest

U.S. Pat. No. 3,220,819 to Jenderisak teaches a hold-down device for a glass bending mold. Glass doublets are positioned on an outline mold and hold-down devices mounted along a selected edge of the bending mold extend over the glass doublet edge and hold the peripheral portion of the glass doublet against the underlying shaping rail. As the glass sheet is heated, the end section of the mold pivots relative to the main portion to shape the heat softened glass sheet while the hold-down devices maintain the glass doublet edge against the shaping rail.

U.S. Pat. No. 4,265,650 to Reese et al. teaches the press bending of windshield doublets between a pair of vertically aligned upper and lower, full surface press faces. Glass sheets are positioned on an outline shaping mold and conveyed through a heating lehr wherein the glass sags by gravity to conform with the mold outline. The mold is then stopped and positioned between the press faces and the lower press face lifts the glass sheets off the outline mold and sandwiches the sheets against the upper press face. After shaping, the lower press face redeposits the glass sheets on the outline mold for continued downstream movement.

U.S. Pat. No. 4,496,386 to Hymore et al teaches a method and apparatus for bending glass sheets. The apparatus includes a lower outline press member having an array of spaced apart shaping rail elements mounted to pass upwardly between adjacent conveyor rolls to contact and support the undersurface of the heat softened glass sheet. A second array of shaping rails is disposed above the conveyor rolls, mounted for movement into and out of association with the spaces between the spaced apart lower shaping rail elements. As the glass sheet is raised by the lower shaping rail and pressed against an upper shaping rail, the second array of shaping rails contact the undersurface of the glass sheet between the first shaping rails to press the peripheral edge of the glass sheet against the upper shaping mold.

U.S. Pat. No. 4,501,603 to Frank et al teaches a method and apparatus for shaping glass sheets to complicated shapes. Heat softened glass sheets are lifted off of conveying rolls by a lower, slatted pressing mold and pressed against a full surface upper vacuum mold. A moveable shaping rail mounted on the upper vacuum mold engages the lower surface of the end portion of the hot glass sheet to sandwich the latter against a corresponding end portion of the upper vacuum mold to shape the glass sheet in the desired complicated configuration.

SUMMARY OF THE INVENTION

This invention provides an apparatus for shaping heat softened glass sheets supported on a shaping rail of an outline bending mold. The apparatus includes a pressing member supported on a frame and a biasing arrangement to move the pressing member from a first position wherein the pressing member is spaced from selected portions of the glass sheet to a second position wherein the pressing member is biased against the glass sheet. In the preferred embodiment of the invention, the bending mold with the glass sheet supported thereon is conveyed downstream through a heating lehr and the pressing member is provided with an sliding arrangement wherein the pressing member moves downstream with the glass sheet. The movement of the pressing member is synchronized such that there is no relative horizontal movement between the glass sheet and the pressing member in the direction in which said bending mold is moved through said lehr when the pressing member contacts the glass sheet.

In one particular embodiment of the invention the pressing member is supported by a pivoting frame that is linked to a piston member that rotates the frame and moves the pressing member from the first, nonengaging position to the second, glass sheet biasing position. In addition a controller controls the downstream movement of the pressing assembly and the pivoting action of the frame to ensure that there is no relative horizontal movement between the pressing member and glass sheet.

In an additional embodiment of the invention, an arrangement is provided to translate the pressing member in a generally horizontal direction transverse to the conveyed direction of the glass sheet through the lehr.

This invention also provides a method of shaping selected portions of a glass sheet supported on a shaping rail of a bending mold. The mold is conveyed through a heating lehr to heat the sheet to its deformation temperature wherein the glass sheet sags by gravity and the perimeter the glass sheet substantially confirms to the shape of the shaping rails positioned slightly inboard of the glass sheet perimeter. A selected surface portion of the hot glass sheets is contacted with a shaping member having a sheet engaging surface with the desired shape of the glass sheet at the selected surface portion. The member is biased against the selected surface portion to conform the surface portion of the glass sheet to the sheet engaging surface of the shaping member. The shaping member is conveyed along the lehr such that there is no relative horizontal movement between the shaping member and the glass sheet in the direction in which the glass sheet is conveyed through the lehr as the shaping member contacts the glass sheet.

BRIEF DESCRIPTION OF THE DRAWINGS

FIGS. 1A and 1B are longitudinal side views of a typical bending lehr showing the loading, heating, shaping, annealing and unloading sections.

DESCRIPTION OF THE PREFERRED EMBODIMENT

Figure 2:
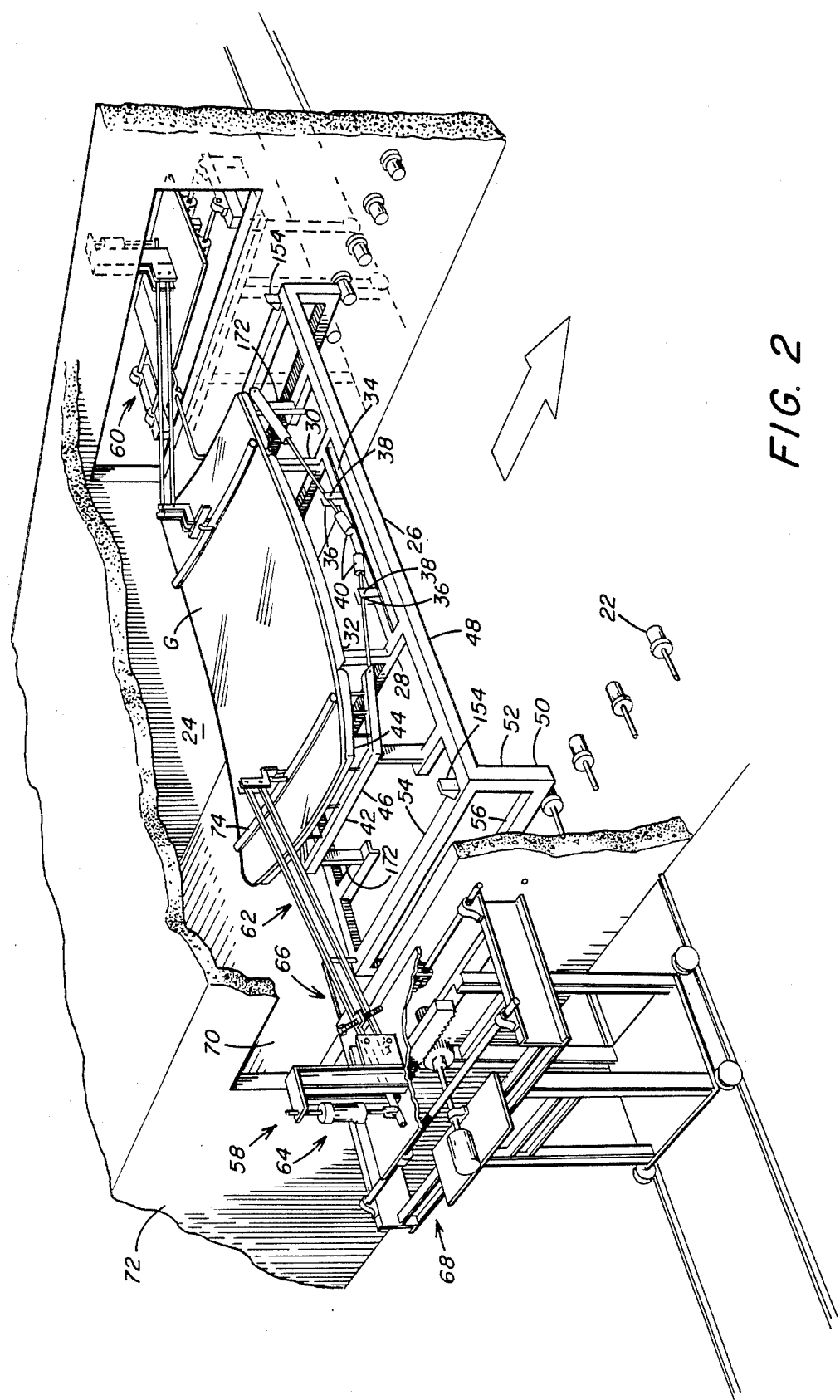
FIG. 2 is a prospective cross sectional view taken through the shaping station of the lehr, along line 2—2, showing hot glass sheets supported on an outline ring mold and the preferred press assembly of the present invention, with portions removed for clarity.

Referring to FIGS. 1A and 1B, there is shown a heating, shaping and annealing lehr for shaping glass sheets. The lehr begins downstream with a loading zone 10 and includes an initial heating zone 12 of tunnel type configuration, a gravity bending zone 14 downstream of the initial heating zone 12, an annealing zone 16 and a cooling zone 18 in end-to-end relation in the downstream portion of the lehr. An unloading zone 20 is positioned beyond the lehr.

A conveyor, comprised of a plurality of stub rolls 22 disposed in transversely opposing, longitudinally spaced relation, extend the entire length of the lehr and defines a path of movement along a longitudinal reference line. As illustrated in FIG. 2, each stub roll 22 is mounted on a shaft that extends through a side wall of the lehr and is connected to a conveyor drive means (not shown). The conveyor may be divided into a number of sections, each driven from its own drive means through conventional drive rod and gear means or chain drives, or the conveyor sections may be driven from a common drive through clutches in any manner well known in the art.

The lehr includes a plurality of glass support molds 24, one of which is shown in FIG. 2, each being supported by a mold carrier 26. Although not limited in the present invention, the particular mold 24 illustrated in FIG. 2 is similar to the mold disclosed in U.S. Pat. No. 4,626,267 to Reese, whose teachings are herein incorporated by reference, and is an articulating mold with pivoting end sections. The mold 24 includes a pair of crossbars 28 which support a number of vertical posts 30 which in turn support the ends of longitudinal shaping rails 32. The surface contours of the shaping rails 32 conform to the shape desired along the longitudinal edges of the glass sheet G supported for bending on the mold 24. Longitudinal members 34 interconnect the crossbars 28. Mounted on members 34 are hinged support posts 36, each of which supports a hinge 38 which includes a weighted lever arm 40 adaptable for pivoting in a substantially vertical plane about an axis defined by the associated hinge 38.

The mold 24 is also provided with two pivoting end mold sections 42. Each of the end mold sections 42 comprises an end rail section 44 whose upper edge forms a surface conforming in elevation and outline to the shape desired for one or the other end portion of the glass sheet G to be shaped on the mold 24. Each end mold section 42 also includes an outrigger 46 attached to the undersurface of the end rail section 44. The outrigger 46 extends outward of the end mold section 42 towards one of the hinges 38 and is attached to the weighted lever arm 40. When the glass sheet becomes heat softened, the lever arm 40 provides a closing pressure that causes the end mold sections 42 to pivot from a spread position in which they support the rigid, flat glass sheet G into a closed position where the upper edges of the end mold sections 42 form continuations of the shaping surfaces provided along the upper edges of the shaping rails 32 so that the shaping rails 32 and 44 form a continuous outline shaping surface to which the glass sheet conforms when shaped.

Cross support beams 48 are mounted on mold carrier 26 with end portions rigidly attached to rigid end frame 50, which includes vertical posts 52, upper carriage rail 54 and lower carriage rail 56. The lower carriage rail 56 rides on the driven stub rolls 22 of the lehr as the rolls convey the mold 24 through the lehr as previously discussed.

FIG. 2 shows press assemblies 58 and 60, which are the subject of this invention, as they are positioned in the lehr relative to the support mold 24 and carriage 26. The assemblies 58 and 60 are similar in construction. The following discussion will be directed to the assembly 58 with the understanding that the discussion is applicable to assembly 60 unless indicated otherwise.

Figure 3:
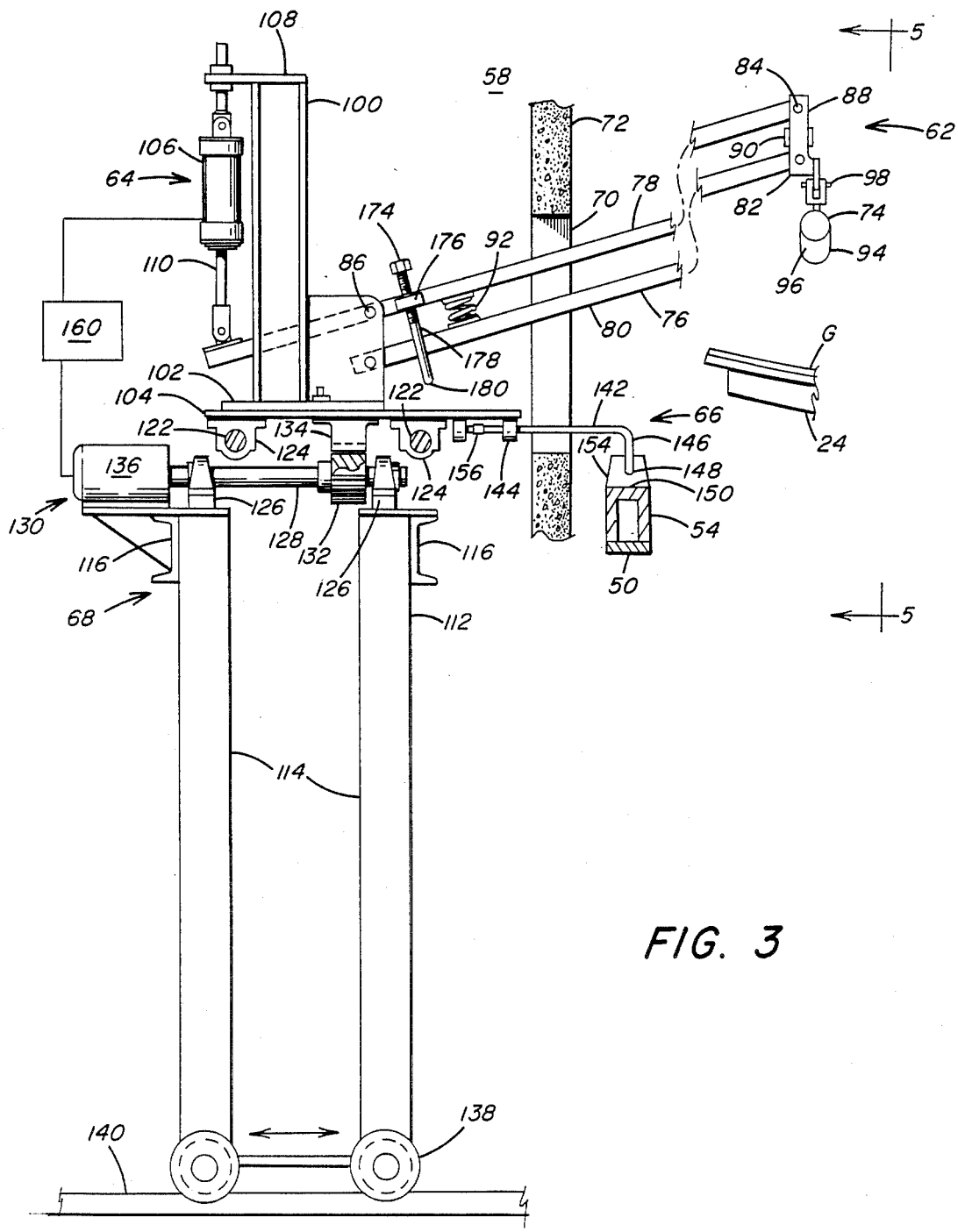
FIG. 3 is a side elevational view of the press arrangement illustrated in FIG. 2 with portions removed for clarity.
Figure 4:
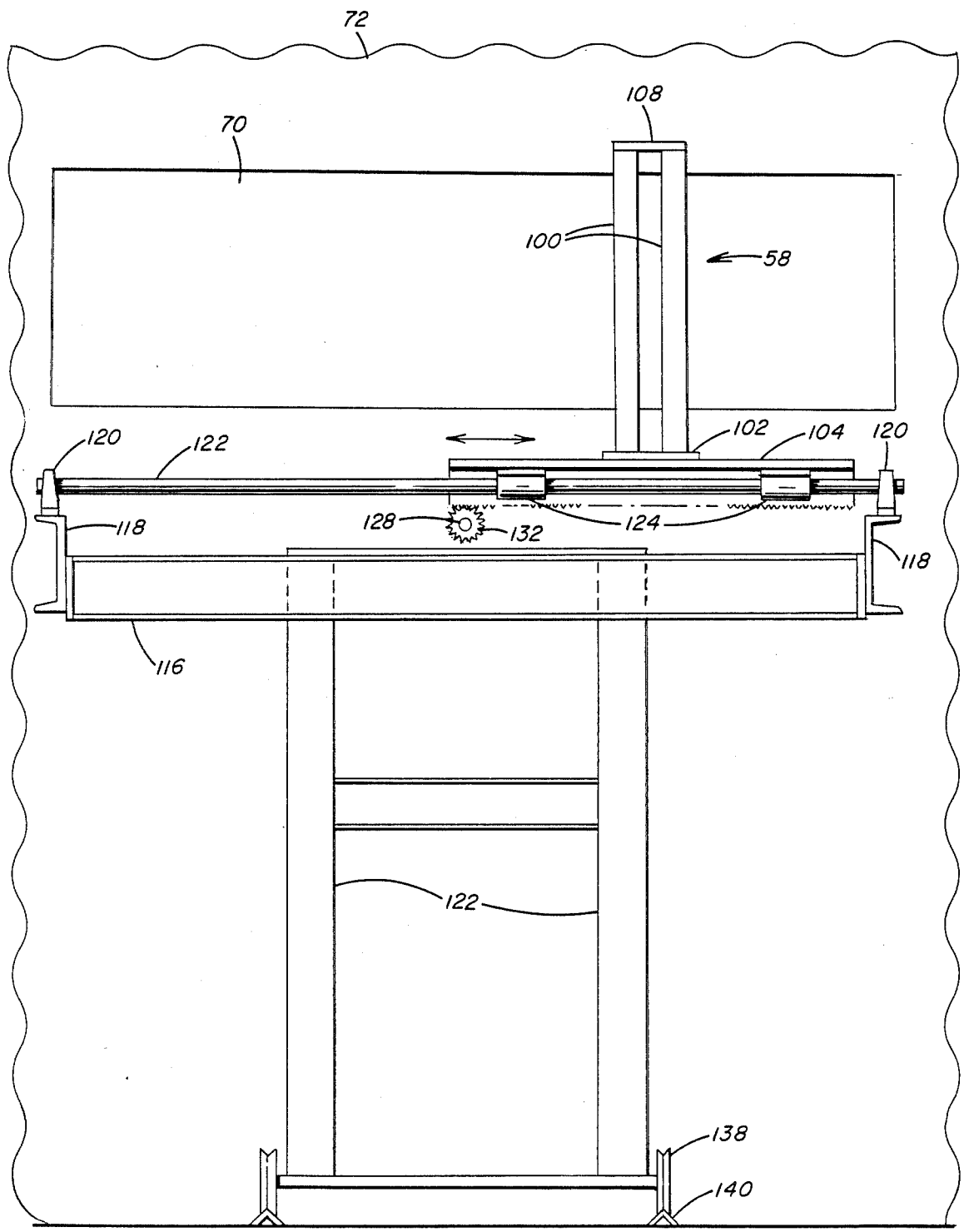
FIG. 4 is a rear elevational view of the press arrangement illustrated in FIG. 2 with portions removed for clarity.

Referring now to FIGS. 3 and 4, the press assembly 58 includes pressing device 62 to contact the glass sheet G, a positioning and biasing means 64 to maintain the pressing device 62 in contact with the glass sheet G and actuating means 66 to activate the positioning biasing means 64 and a support stand 68.

The pressing device 62, which contacts glass sheet G while the glass sheet move through the lehr supported on the mold 24, is inserted into the lehr through opening 70 in lehr wall 72, and includes a glass contacting press member 74 mounted on one of the short sides of a parallelogram shaped linkage assembly 76. The linkage assembly 76, which is comprised of an upper arm 78, a lower arm 80 and a press member support bracket 82, has corresponding ends of the upper arms 78 and lower arm 80 pivotally connected to the bracket 82 and the support stand 68, preferably by nut and bolt assemblies 84 and 86, respectively, such that the upper arm 78 is generally parallel to the lower arm 80. If required, cooling fluid (not shown) such as air may be circulated through arms 78 and 80 to control their temperature while within the lehr. In the particular embodiment illustrated in FIG. 3, the bracket 82 includes side plates 88, only one of which is shown in FIG. 3, to which nut and bolt assemblies 84 attach the bracket 82 to the upper arm 78 and lower arm 80, and cross plate members 90. Press member 74 is preferably pivotally connected to the lower portion of the bracket 82 in the manner to be discussed later. If required, a spring 92 may be positioned between upper arm 78 and lower arm 80, as shown in FIG. 3, to remove any slack in the assembly 76.

Although not limited in the present invention, in the particular embodiment illustrated in FIG. 3, press member 74 is a curved pipe member 94, constructed from a heat resistant material, such as stainless steel, which contacts the shaped glass sheet G along a contact line to impart additional shape to the glass sheet. The lower glass sheet contacting surface 96 of the pipe member 94 corresponds to the desired curvature of the glass sheet G along the line at which the pipe 94 contacts the glass sheet. It should be appreciated that the glass contacting surface 96 of pressing member 74 may be such that it contacts large portions of the glass sheet surface and, if required, the entire glass sheet surface. Pipe member 94 is preferably pinned to the bracket 82 such that it may rotate about a horizontal axis generally perpendicular to the longitudinal axis of the pipe member 94 while being prevented from being rotated about a vertical axis at the end of the linkage assembly 76. This pinned connection 98 allows the pipe member 94 to be self aligning as it contacts the glass sheet G so that the press member 94 will operate effectively even if the entire contacting surface 96 of the pipe member 94 does not contact the glass sheet G surface simultaneously. If the curved configuration of the glass sheet requires that the entire contacting surface 96 of the press member 94 contact the glass sheet simultaneously, the press member 74 may be fixed to the bracket 82 at the required orientation.

Figure 7:
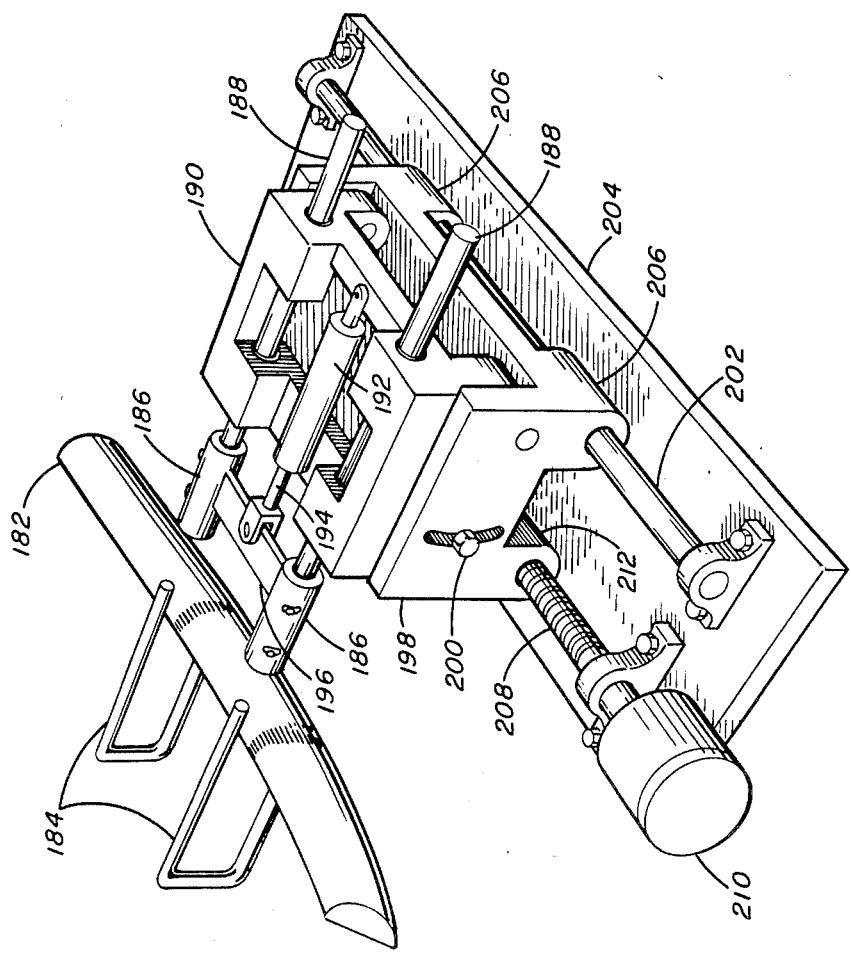
FIG. 7 is an alternate embodiment of the present invention.
Figure 5:
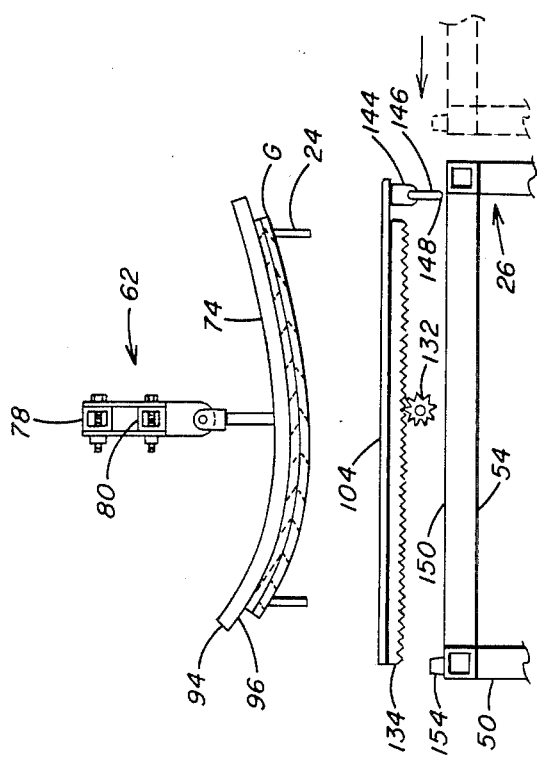
FIG. 5 is a view through line 5—5 of FIG. 3.

In the particular embodiment of the invention illustrated in FIGS. 2 through 5, the press member 74 is a pipe section that provides line contact between the glass sheet and the pipe surface. It is obvious that the pipe member 94 may be replaced by a partial press face, as shown in FIG. 7, with a shaping surface which contacts a selected area of the glass sheet as will be discussed later. The press surface may be constructed from any heat resistant materials such as stainless steel, meehanite or ceramics.

Referring now to FIGS. 3 and 4, the support stand 68 includes a pair of spaced channel members 100 with upper arm 78 and lower arm 80 rotatably positioned therebetween to allow pivoting movement about nut and bolt assembly 86. The channels 100 are positioned on mounting plate 102, which is secured to sliding base plate 104 in any convenient fashion. The linkage assembly 76 is pivoted by the positioning and biasing means 64, which preferably is a pneumatic or hydraulic cylinder 106 mounted from support plate 108 of the support stand 68, with piston rod 110 of cylinder 106 pinned to an extended portion of upper arm 78. As the piston rod 110 of the cylinder 106 retracts, arms 78 and 80 rotate about nut and bolt assemblies 86, translating into a clockwise rotation of the linkage assembly 76 about the support stand 68 and a downward movement of press member 74 as shown in FIG. 3. When the piston rod 110 moves out of the cylinder 106, the previously described action is reversed and the linkage assembly 76 pivots counterclockwise about nut and bolt assemblies 86.

Although cylinder 106 is preferably a pneumatic or hydraulic cylinder, it is obvious to one skilled in the art that other positioning and biasing means may be used, i.e., a cam and spring or a motor drive arrangement.

With continued reference to FIGS. 3 and 4, support stand 68 further includes a support carriage 112 which includes post members 114, sliding rail support members 116 and 118, and shaft support blocks 120 mounted on support members 118 to support sliding rails 132. The rails 122 extend in a longitudinal, downstream direction relative to the lehr and are slidably captured by shaft collar members 124 mounted to the bottom of sliding base plate 104. Pillow blocks 126 are mounted to the top of two of the posts 114 to support drive shaft 128 of press assembly drive arrangement 130. The drive shaft 128 includes a gear 132 which meshes with gear rack 134 secured to the underside of sliding base plate 104. Motor 136 drives shaft 128 so that base plate 104 supporting pressing device 62 and positioning and biasing means 64 of the press assembly 58 moves longitudinally along rails 122. The motor 136 of drive arrangement 130 is preferably a reversible drive which is capable of driving the base plate 104 both upstream and downstream relative to the lehr. As an alternative, multiple motors or a clutch arrangement may be used move the press assembly 58 along the lehr.

Posts 114 are mounted on wheels 138 which ride on rails 140 which are generally perpendicular to the lehr. This arrangement allows the press assembly 58 to be moved further into or withdrawn from the lehr so as to properly position the press members 74 relative to the traveling glass sheet G.

Due to the geometric properties of the linkage assembly 76 which is a parallelogram, i.e., a four-sided figure with opposite sides parallel and equal, as the linkage assembly 76 is rotated by cylinder 116, it maintains it's parallelogram shape and the orientation of press member 74 remains constant. The nut and bolt assemblies 84 and 86 maintain corresponding points on the upper arm 78 and lower arm 80 at support stand 68 in an orientation, one vertically disposed above the other so that the orientation of bracket 82 also remains vertical as the assembly 76 rotates. Since the press member 74 is pinned to the bracket 82 as discussed supra, the orientation of the member 74 remains fixed.

It should be noted that press member 74 may also be pinned to the bracket 82 such that it freely rotates about a horizontal axis generally aligned with the longitudinal axis of the lehr. With such a mounting arrangement, the configuration of linkage assembly 76 may be such that bracket 82 does not have to remain vertical when assembly 76 rotates since the press member may pivot about the axis and maintain the proper orientation for engagement with the glass sheet G.

As an alternative to the parallelogram shaped arrangement of linkage assembly 76, a single pivoting arm member may replace arms 78 and 80 with the press member 74 being pinned to the end of the single arm (not shown). Such a member must be sufficiently rigid to support press member 74 for accurate tracking of and engagement by the press member 74 relative to the moving glass sheet G.

The cylinder 106 is activated by actuator means 66 which initiates the pressing cycle. In the particular embodiment illustrated in the FIGS. 3 and 5, elongated, L-shaped, pivoting trip arm 142 is mounted to the underside of base plate 104 by pillow blocks 144. End 146 of the trip arm 142 is positioned within the lehr and extends downward with a tip portion 148 generally aligned with and terminating adjacent to the upper surface 150 of the upper carriage rail 54 of the rigid end frame 50. As the mold carriage 26 is conveyed through the lehr, the tip portion 148 contacts a trip plate 154 mounted at the downstream end of the upper rail 54 of the carriage 26 causing the trip arm 142 to rotate clockwise, as viewed in FIG. 5, about an axis defined by the pillow blocks 144. This rotation of the trip arm 142 rotates a tab 156 of the trip arm 142 into contact with the microswitch (not shown) positioned in close proximity to the tab 156, which in turn activates a timing sequence in controller 160 (shown in FIG. 3 only). The controller 160 controls the downstream movement of the press assembly 58 via motor 136 and the pivoting action of the linkage assembly 76 via cylinder 106 as the mold 24 continues to move through the lehr with the heat softened glass sheets G supported thereon, as will be discussed later.

It is obvious to one skilled in the art that there are other ways well known in the art to activate the cylinder 106 and motor 136 rather than using a trip arm 142. For example, light or temperature sensors may be used to locate the exact position of the support carriage 26 within the lehr and initiate a timing sequence to activate and deactivate cylinder 106 as well as activate and reset the drive arrangement 130.

The press assembly drive arrangement 130 moves the linkage assembly 76 with the pressing member 74 attached thereto along with the moving mold 24. The controller 160 matches the speed of sliding base plate 104 with the mold support carriage 26 as it travels through the lehr so that there is no relative movement between the press member 74 and the glass sheet G. In glass sheet configurations where it is critical that the press member 74 contact the glass sheet G at a precise location on the glass sheet, the mold 24 with the glass sheet supported thereon may be aligned and squared within the lehr prior to it being contacted by the pressing member 74. The mold 24 may be aligned in any convenient fashion, such as that disclosed in U.S. Pat. No. 4,290,796 to Reese et al, whose teachings are herein incorporated by reference.

Figure 6:
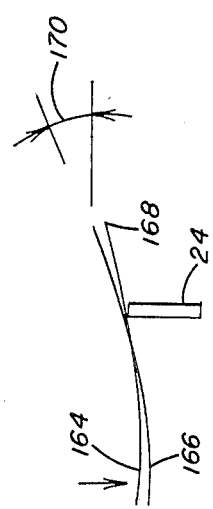
FIG. 6 is a schematic illustrating the approach angle of the glass sheet at the shaping rail of the outline mold, with and without the pressing arrangement of the present invention.

As discussed earlier, the heat softened glass sheets G tend to draw glass for the longitudinal end portions during sag bending. As a result, the peripheral portions of the glass sheet G tend to flatten out, i.e. the curvature of the glass sheets about its periphery, and in particular along the A post, is reduced. Referring to FIG. 6, line 164 represents the curvature of the glass sheet from a conventional sag bending operation. As taught of the present invention, selected portions of the glass sheet may be contacted by the press member 74 to urge the glass sheet downward so as to conform the glass sheet to the desired configuration, as shown by line 166. As a result of this pressing action, the edge 168 of the glass sheet G rotates upward, i.e., counter clockwise as viewed in FIG. 6, increasing its approach angle 170 to that required for proper installation and resultant aerodynamics of the vehicle.

In operation, glass sheets are positioned on the shaping rail of the glass support mold 24. In a preferred embodiment of the invention, overlaying glass sheets, or glass doublets, are serially conveyed through the lehr on mold carriages 26 and heated to their heat deformation temperature so that the glass sheets sag by gravity into conformance with the shaping rails 32 and 44. As the mold carriage 26 continues downstream in the lehr, tip 148 of the trip arm 142 contacts trip plate 154 which initiates the shaping sequence by the controller 160. Motor 136 is activated and moves sliding base plate 104 with linkage assembly 76 and pressing member 74 mounted thereon, downstream at the same rate of travel as the mold carriage 26. Cylinder 106 retracts piston rod 110, causing linkage assembly 76 to rotate clockwise, thus lowering pressing member 74 into contact with the upper major surface of the glass doublets on the mold 24. The cylinder 106 provides a pressing force so as to insure that the glass sheets conform to the shape contacting surface 96 of the pressing member 74. After a predetermined time interval of contact between the pressing member 74 and the glass doublets G, the cylinder 106 extends the piston rod 110 to rotate linkage assembly 76 in a counterclockwise direction to lift pressing member 74 off the glass doublet. The motor 136 then reverses direction and moves sliding base plate 104 along rails 140 back to its original position to await the next mold carriage 26.

The amount of pivoting movement by the linkage assembly 76 depends on the final glass sheet shape and the orientation of the press member 74. In an arrangement where the press member 74 generally parallels the longitudinal axis of the lehr, the amount of movement that will remove the press member 74 from the glass sheets G and allow the mold 24 to continue downstream without interference is minimal. When the press member 74 is skewed as shown in FIG. 2 such that the member 74 will interfere with the curved end portions of the shaped glass sheet, the press member 74 must be raised above the mold 24 a distance sufficient to allow the shaped glass sheets to proceed downstream through the lehr without interference from the pressing member 74.

It is understood that although the present invention teaches a traveling press arrangement, as an alternative, the mold carriage 26 may be stopped and pressed by a stationary partial press assembly. Although such an arrangement would eliminate the need for the rail mounted sliding base plate 104, it would increase the cycle time within the lehr by requiring the molds to stop and be aligned (if necessary) prior to pressing, and restarted to continue through the lehr.

Depending on the shaped glass shape configuration, the downward force exerted by the cylinder 106 on the pressing member 74 to press the glass sheet surface may be sufficient to overcome the closing pressure provided by the counterweighted lever arm 40 of the end mold sections 42 with the result that the end mold sections 42 open. To prevent this, a hinged locking member 172 is attached to the mold end sections 42 to lock it in a closed position after it has closed normally (see FIG. 2). This allows the pressing member 74 to press the glass against a rigid mold rail.

Although not limiting in the present invention, the pressing assemblies 58 and 60 are placed at the beginning of the annealing zone 16. At this point the glass is soft enough to be formed by the pressing member 74, yet it hardens quickly as the pressing assemblies 58 and 60 and enter the annealing zone 16.

If required, a positive adjustable stop 174 may be mounted on the assembly 76 to further limit the downward movement of the pressing member 74. Though not limited in the present invention, stop 174 may include a nut 176 rigidly secured to the upper arm 78 and a threaded bolt 178 passing therethrough such that the lower tip 180 of the bolt 178 abuts mounting plate 102. The downward travel of the pressing member 74 is adjusted by rotating threaded bolt 178.

FIG. 7 illustrates an alternate embodiment of the present invention. In this particular arrangement the pressing member does not pivot in a vertical plane but rather moves transversely relative to the lehr, i.e., outward relative to the longitudinal axis of the lehr, to provide additional pressing action in the shaping operation. Pressing member 182 is mounted on arm members 184, both of which are custom built for each glass sheet pattern. The arms 184 are coupled with collars 186 from which rod members 188 extend into and are slidably secured within pivot block 190. Cylinder 192 is pinned at one end to pivot block 190 with piston rod 194 pinned to cross member 196 connecting collars 186. The extension and retraction of piston rod 194 moves pressing member 182 supported on arms 184 in a transverse direction across the lehr, relative to the downstream movement of the glass sheets. The pivot block 190 is mounted on sliding block 198 and is provided with an angle adjustment arrangement 200 to position the press member 182 in a correct orientation which may be manually adjustable as shown in FIG. 7 or automatically adjustable via a drive means, e.g., cylinders or motors (not shown). Rail member 202 is mounted on support plate 204 and extends through boss members 206 of sliding block 198. Threaded shaft 208 which is connected to motor 210 extends through boss members 212 so that rotation of shaft 208 by motor 210 will move the sliding block 198 upstream and downstream relative to the lehr. A support platform (not shown) supports the pressing arrangement at the proper elevation alongside the lehr. The activation and control of cylinder 192 and motor 210 may be similar to that described, supra.

In light of the teachings herein, it would be obvious to one skilled in the art to combine the pressing assembly 58 as illustrated in FIG. 2 with the embodiment illustrated in FIG. 7. In particular, the linkage assembly 76 may be modified such that the length of arms 78 and 80 are adjustable so that the pressing member 74 may be moved in a direction transverse to the mold 24 movement through the lehr as shown in FIG. 7.

In addition, it would be obvious to use multiple pressing assemblies along each side of the heating lehr if the desired shape required a difficult curved configuration.

The present invention provides a positive means for shaping heat softened glass sheets G on an outline mold as they are conveyed through a heating lehr. As compared to using additional heat to accomplish the same ends, which in turn affects a larger portion of the glass sheet making it more difficult to control sag as well as making the overall process less energy efficient, or stopping the downstream movement of the glass sheet through the lehr to allow pressing of the glass sheets between upper and lower shaping surfaces, the pressing assemblies in the present invention precisely shapes the glass sheets at a localized area without changing conveying rates or adversely effecting the curvature or other portions of the glass sheet.

The forms of this invention shown and described in this disclosure represent preferred embodiments and it is understood that various changes may be made without departing from the scope of the invention.

We claim:

1. In an apparatus for shaping a glass sheet to a desired contour wherein the apparatus includes means to heat said glass sheet to be shaped to a heat deformation temperature and a shaping rail within said heating means to support a glass sheet to be shaped wherein said glass sheet is heated while supported on said rail such that the peripheral edge of said glass sheet conforms to the shape of said shaping rail, the improvement comprising:
   shaping means having a glass sheet engaging surface corresponding to the desired curvature of selected portions of said shaped glass sheet located within said shaping rail; and
   means to bias said shaping means into contact with said selected portions of said glass sheet while said glass sheet is supported on said shaping rail.

2. The apparatus as in claim 1 wherein said shaping means includes a support frame mounted on a platform and a glass sheet pressing member mounted on said frame and said biasing means includes means for moving said pressing member from a first position wherein said pressing member is spaced from said selected portions of said glass sheet to a second position wherein said pressing member is biased against said glass sheet.

3. The apparatus as in claim 2 wherein said shaping rail with said glass sheets supported thereon is horizontally movable through a heating lehr and further including means to horizontally move said shaping means relative to said lehr and means to synchronize the horizontal movement of said shaping means supported on said shaping rails with the horizontal movement of said glass sheet such that there is no relative horizontal movement between said glass sheet and said shaping means in the direction in which said shaping means is moved through said lehr when said shaping means contacts said glass sheet.

4. The apparatus as in claim 3 wherein said support frame is a pivoting frame and said biasing means further includes means to pivot said frame to move said pressing member from said first position to said second position.

5. The apparatus as in claim 4 wherein said horizontally moving means includes generally horizontally extending rail members supported by a support carriage wherein said platform is slidably secured to said rail members and further including means to drive said platform along said rails.

6. The apparatus as in claim 5 wherein said pressing member maintains a generally constant orientation relative to said glass sheet to be shaped as said frame pivots.

7. The apparatus as in claim 6 wherein said pivoting frame includes two pairs of members pivotally connected to one another to provide a parallelogram in shape wherein members of each pair remain parallel to one another as said frame pivots in a plane generally perpendicular to said lehr.

8. The apparatus as in claim 5 wherein said biasing means includes a piston member pivotally connected to said frame to pivot said frame from said first position to said second position and maintain a biasing force on said pressing member against said selected glass sheet portions when said frame is in said second position.

9. The apparatus as in claim 8 further including means to locate the position of said shaping rail relative to said shaping means as said shaping rail is conveyed through said heating lehr and said synchronizing means include means to control and coordinate the movement of said platform along said rails, the pivoting movement of said frame as said pressing member moves from said first position to said second position, and the biasing of said pressing member to contact said selected portions of said glass sheets.

10. The apparatus as in claim 2 wherein said shaping rail is horizontally movable through a heating lehr and said biasing means includes means to translate said pressing member in a generally horizontal direction transverse to the conveyed direction of said glass sheet through said lehr.

11. The apparatus as in claim 10 further including means to adjustably pivot said support frame.

12. The apparatus as in claim 11 wherein said translating means includes a piston member with a first end secured to said support frame and a second end interconnected with said connecting arms for transverse movement of said pressing member.

13. The apparatus as in claim 12 further including means to locate the position of said shaping rail relative to said shaping means and said synchronizing means includes means to control and coordinate the transverse movement of said pressing member from said first position to said second position and the biasing of said pressing member against said selected portions of said glass sheet.

14. The apparatus as in claim 9 further including means to translate said pressing member in a generally horizontal direction transverse to the conveyed direction of said glass sheets through said heating lehr.

15. The apparatus as in claim 14 wherein said synchronizing means further includes means to control said transverse movement of said pressing member.

16. In a method of shaping a glass sheet to a desired curvature including the steps of supporting said glass sheet on a shaping rail of a bending mold, conveying said shaping rail through a heating lehr, and heating said supported glass sheet within said lehr to its deformation temperature wherein said glass sheet sags by gravity and the perimeter of said glass sheet substantially conforms to the shape of said shaping rail positoned inboard of the perimeter of said glass sheet, the improvement comprising:
  contacting selected surface portions of said shaped glass sheet located within said shaping rail with a shaping means having a sheet engaging surface with the desired shape of said glass sheet at said selected surface portions; and
  biasing said shaping means against said selected surface portions to conform said surface portions of said shaped glass sheet to said sheet engaging surface of said shaping means while continuing to support said glass sheet on said shaping rail.

17. The method as in claim 16 further including the step of synchronizing the movement of said shaping means with said conveying of said shaping rail such that there is no relative movement between said shaping means and said glass sheet as said shaping means is in contact with said glass sheet.

18. The method as in claim 17 wherein said contacting step includes moving said shaping means from a first position wherein said shaping means is spaced from said selected surface portions of said glass sheet to a second position wherein said shaping means contact said selected surface portions of said glass sheet.

19. The method as in claim 18 wherein said synchronizing step includes conveying said shaping means relative to said lehr such that there is no relative movement between said shaping means and said glass sheet as said shaping means is in contact with said glass sheet.

20. The method as in claim 19 wherein said bending mold includes at least one pivotable end section and further wherein prior to said contacting step including the steps of:
  pivoting said end section of said mold from an opening position wherein a substantial portion of said glass sheet is spaced from said shaping rail, to a closed portion wherein said glass sheet conforms to the shape of said shaping rail; and
  locking said end portion in said closed position.

* * * * *